United States Patent [19]
Mori et al.

[11] Patent Number: 5,071,235
[45] Date of Patent: Dec. 10, 1991

[54] SMALL TYPE VARIABLE FOCAL LENGTH LENS

[75] Inventors: Nobuyoshi Mori; Akira Ishisaka, both of Hachioji, Japan

[73] Assignee: Konica Corporation, Tokyo, Japan

[21] Appl. No.: 335,928

[22] Filed: Apr. 11, 1989

[30] Foreign Application Priority Data

Apr. 15, 1988 [JP] Japan .................................. 63-91831
Jun. 6, 1988 [JP] Japan .................................. 63-137499

[51] Int. Cl.$^5$ ......................... G02B 15/00; G02B 9/04
[52] U.S. Cl. .................................... 359/692; 359/740; 359/795
[58] Field of Search ............... 350/442, 443, 426, 247, 350/457, 431, 427, 421–423, 449, 450, 469, 483

[56] References Cited

U.S. PATENT DOCUMENTS

| | | | |
|---|---|---|---|
| 4,015,897 | 4/1977 | Konoma et al. | 350/450 |
| 4,124,276 | 11/1978 | Okano et al. | 350/431 |
| 4,682,860 | 7/1987 | Tanaka et al. | 350/423 |
| 4,815,830 | 3/1989 | Sato et al. | 350/427 |
| 4,911,539 | 3/1990 | Tsunashima et al. | 350/450 |
| 4,932,764 | 6/1990 | Simpson, Jr. | 350/480 |

Primary Examiner—Bruce Y. Arnold
Assistant Examiner—Thong Nguyen
Attorney, Agent, or Firm—Finnegan, Henderson, Farabow, Garrett and Dunner

[57] ABSTRACT

A small type zoom lens composed of 3 to 5 lenses, which is suitable for a compact camera. The lens has a telephoto type optical arrangement including a positive first lens unit and a negative second lens unit, both of the lens units being moved forward as a whole while narrowing a space therebetween during variation of power from a short focal end to a long focal end. The first lens unit has an arrangement of refracting powers substantially symmetrical with respect to a diaphragm to correct aberrations produced by the second lens unit composed of a negative single lens.

20 Claims, 13 Drawing Sheets

F 5.6
-0.5　0　0.5
SPHERICAL
ABERRATION
SINE
CONDITION

ω=31.0°
-0.5　0　0.5
ASTIGMATISM

ω=31.0°
-2.0　0　2.0(%)
DISTORTION

F 7.62
-0.5　0　0.5
SPHERICAL
ABERRATION
SINE
CONDITION

ω=23.8°
-0.5　0　0.5
ASTIGMATISM

ω=23.8°
-2.0　0　2.0(%)
DISTORTION

SMALL TYPE VARIABLE FOCAL LENGTH LENS

BACKGROUND OF THE INVENTION

1. Field of the Invention

This invention relates to a compact variable focal length lens, and more particularly to a variable focal length lens assembly including a wide angle of which the number of lenses is about three to five, and which is suitable for a lens shutter camera or the like.

2. Description of the Prior Art

Compact cameras recently available include not only ones having a single focal length, but ones including a converter lens to switch the focal length and ones having a zoom lens mounted thereon. The demand for these variable power lenses has been increasing. However, such a variable power optical system is larger in size than a single focal lens, and has an increased number of lenses, which detracts from the compactness and lower cost of cameras.

For example, a camera encasing a converter lens is disclosed in Unexamined Published Japanese Patent Application No. 95210/1981. This camera includes a rear converter lens and the lens is mounted at the rear of a main lens at the long focal length. A total of six lenses are required to form the main lens and the converter lens. In unexamined Published Japanese Patent Application No. 201213/1982, a zoom lens is composed of 5 to 8 lenses. A simple zoom lens which has a relatively lesser number of lenses is disclosed in Unexamined Published Japanese Patent Application No. 48009/1985, which is composed of four lenses. In this case, however, when an attempt is made to increase the refracting power of a rear group to shorten an overall length, the curvature of a concave surface increases since the rear group comprises a meniscus lens, and a variation of spherical aberration at the time of variation of power increases. Consequently of which the spherical aberration becomes large in under correction on the wide angle side and in over at the telephoto end, and in addition, coating of the lens is difficult.

Furthermore, in the embodiment of the zoom lens, the focal length at a wide angle is 40 mm, which is somewhat too long for the wide angle lens. In order to make it into a wide angle, approximately 35 mm, off-axial aberrations need be further corrected, thus making it difficult to constitute the lens group only by four lenses.

SUMMARY OF THE INVENTION

It is therefore an object of this invention to provide a zoom lens which is compact, performs well has a variable focal length such that the zoom lens can be formed into a wide angle to an extent of 35 mm on the short focal side, and has a greatly reduce number of lenses, 3 to 5, involving none of the problems encountered in the prior art as described above.

For achieving the object of the present invention, a telephoto type lens which has a positive, first lens unit and a negative second lens unit is described. The invention is represented by a variable focal length lens such as a zoom lens adapted to be moved forward, during the variation of power from the short focal side to the long focal side, while narrowing a space between the first lens unit and the second lens unit, or a multi-focal lens which has focal lengths in opposite ends and some intermediate portions thereof, characterized in that a refractive surface having a negative refracting power is arranged in the vicinity of a diaphragm positioned in said first lens unit.

In the simplest structure, two positive meniscus lenses are arranged with a diaphragm put therebetween in the first lens unit, and the negative refracting power is given by two surfaces opposed to each other and having a negative refracting power.

As the case may be, one of said two positive lenses may be composed of a lens to which a negative lens is cemented.

The first lens unit may be designed to include, in order from an object side, at least one positive lens and at least one negative lens, so as to have a positive refracting power as a whole.

In this case, the first lens unit can be composed of, in order from an object side, a first lens having a positive refracting power, a second lens having a negative refracting power and a third lens having a positive refracting power.

The second lens unit can be formed from a single lens wherein the refracting power of one refractive surface is smaller than zero and another refractive surface is either zero or smaller than zero, that is, a plano-concave lens or a double-concave lens.

For the purpose of compactness, the variable focal length lens according to this invention preferably satisfies the following conditions:

$$f_2/f_w < -0.5 \tag{1}$$

$$\left| \frac{f_1}{f_w} - \left( \frac{f_2/f_w}{(f_2/f_w) - 1} \right)^{\frac{1}{2}} \right| < 0.2 \tag{2}$$

$$0.7 < |f_2/f_1| < 1.6 \tag{3}$$

where $f_1$ and $f_2$ represent the focal lengths of the first lens group and the second lens group, respectively, and $f_w$ represents the focal length on the short focal side.

For obtaining better aberration correction, the aforesaid lens preferably satisfies the following condition:

$$D_F/f_w > 0.04 f_w/f_B^w \tag{4}$$

where $f_w$ and $f_B^w$ represent the focal length and the back focal length, respectively, at the lower limit of the range of variation of the length. $D_F$ represents the sum of the axial thickness of the lenses at the rear of the diaphragm within the first lens unit.

Generally, in a two-group zoom lens composed of a positive first group and a negative second group, a negative spherical aberration occurs on the telephoto side during variation of power. In order to suppress the variation of the aberration, it is effective to arrange a positive lens on the object side of a negative lens in the second group to offset the spherical aberration. However, in the case where the second group comprises only a negative lens in order to reduce cost, the variation of aberration cannot be corrected by the other lenses, and therefore, an occurrence of aberration caused by the negative lens should be minimized.

To this end, it is effective to make the negative lens double-concave or plano-concave so that the curvature of surfaces having a negative refracting power will not become excessively large. Particularly, in the case where it is desired to make the refracting power of both the first and second groups great to shorten the overall length, such construction as just mentioned need be employed.

By the provision of the double-concave lens, distortion at the wide angle side tends to occur, but this can be corrected within the first group.

In the positive first group, lenses are arranged substantially symmetrically with a diaphragm put therebetween. Thereby, with respect to the off-axial ray bundle, aberrations occur before and behind the diaphragm so as to offset each other with respect to the ray bundle around a principal ray, and aberrations produced by the entire front unit can be decreased. Particularly, distortion is small. With respect to coma, for example, with regard to the upward ray bundle in front of the diaphragm, the extrovert coma produced at the frontward positive lens is offset by the introvert coma produced at the positive lens at the rear of the diaphragm. Particularly, in the case where the ray bundle is thin, there is no flare which occurs in the periphery of the ray bundle and sufficient correction effect may be obtained. Because of this, if such a structure is used for a simple variable focal length lens of which the F-number is approximately 5.6, for example, sufficient correction of the off-axial aberrations can be accomplished with the minimum number of constituent elements. There are many lens surfaces concentrically arranged, and an astigmatism occurs less.

As described above, it is possible for the present invention to provide a variable focal length lens which can sufficiently suppress the occurrence of the off-axial aberrations by an extremely simple structure.

When the limit of formula (1) is exceeded, the back focal length at the end of short focal length becomes short and the diameter of a rear lens in the second lens unit increases.

Formula (2) is the condition for shortening the overall length of the lens at the end of short focal length. Generally, the overall length at the end of short focal length, that is, the length $L_w$ from the foremost end of the lens to the image plane is given by $$L_w = f_2\left(2 - m_2 - \frac{1}{m_2}\right) + f_1 \quad (a)$$

where $m_2$ represents the image-forming magnification of the second lens group, which is represented by $$m_2 = f_w/f_1$$

Substitute this in formula (a), then $$L_w = f_2\left(2 - \frac{f_w}{f_1} - \frac{f_1}{f_w}\right) + f_1$$

$L_W$ is minimized when $f_1$ satisfies the following condition, assuming that $f_2$ is constant.

$$\frac{f_1}{f_w} = \left(\frac{f_2/f_w}{(f_2/f_w) - 1}\right)^{\frac{1}{2}}$$

Accordingly, if $f_1$ and $f_2$ are determined so as to satisfy the condition of formula (2), $L_w$ becomes small. That is, the overall length of the lens at the end of short focal length becomes short, and thus a compact camera is obtained.

The formula (3) is the condition concerning the amount of movement of the second lens group during variation of power. Generally, in variable focal length lens as in this invention, the diameter of a rear lens is large, and the second lens group including this lens moves greatly forward to effect variation of power. Therefore, the other method for making a camera compact comprises decreasing the amount of movement of the second lens group. When the upper limit of formula (3) is exceeded, the amount of movement of the second group becomes excessively large. When the lower limit of formula (3) is not satisfied, the amount of movement of the second group is small, but the overall length of the lens tends to increase, and the back focal length also becomes short to increase a diameter of a rear lens.

Condition (4) is concerned with the correction of aberrations, particularly correction of distortion. In a variable focal length lens as in the present invention, when the back focal length becomes short, a positive distortion tends to occur. In order to correct this, it is effective to make thick lenses at the rear of a diaphragm. When the sum of the axial thicknesses of the lenses at the rear of the diaphragm within the first lens unit satisfy condition (4), the distortion is improved.

Focusing in the present invention can be performed by moving the first lens group forward or moving the second lens group backward, in which case, the variation of aberrations is small.

DETAILED DESCRIPTION OF THE PREFERRED EMBODIMENTS

Preferred embodiments of the present invention which satisfy the above-described conditions will be shown below.

First Embodiment

Figure 1:
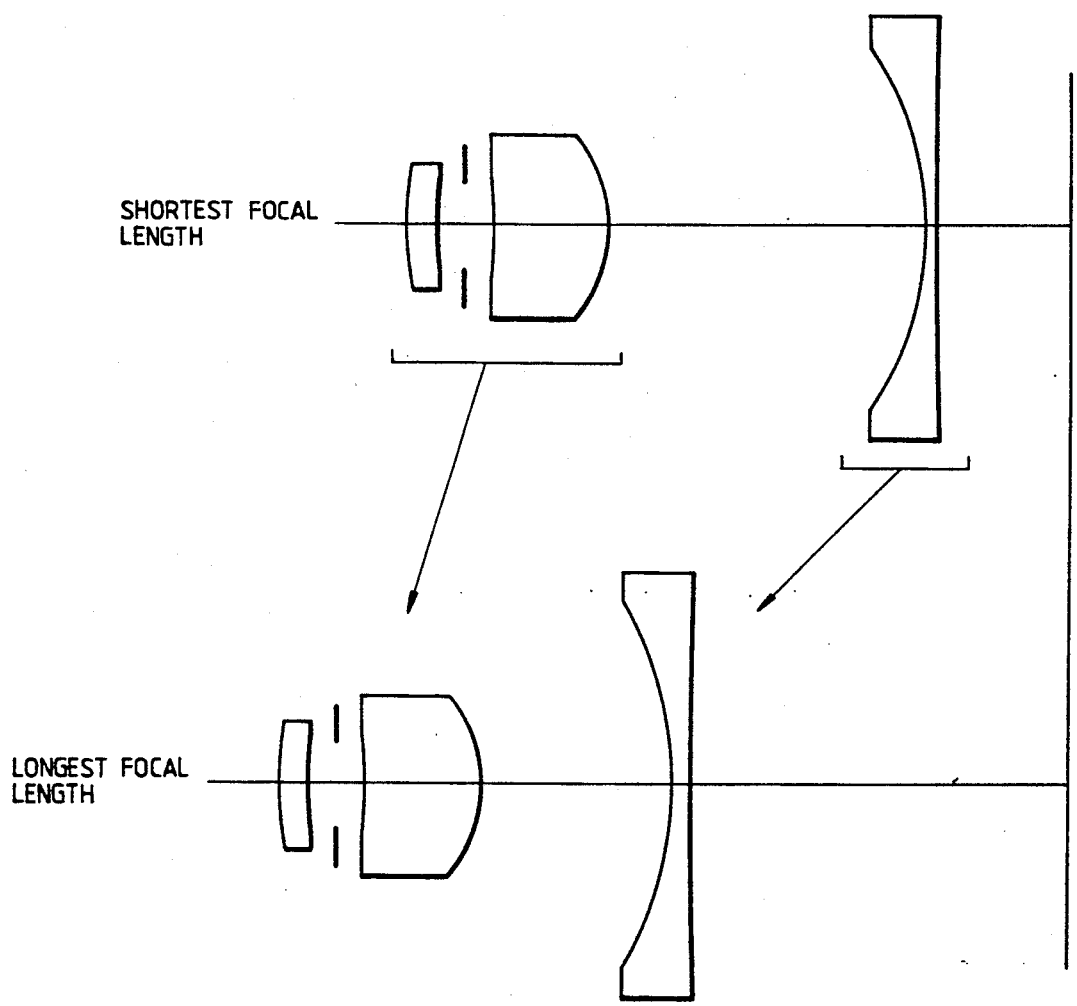
FIG. 1 is a sectional view of a first embodiment according to the present invention, showing a method for varying a focal length in a zoom lens system according to the present invention.
Figure 2A:
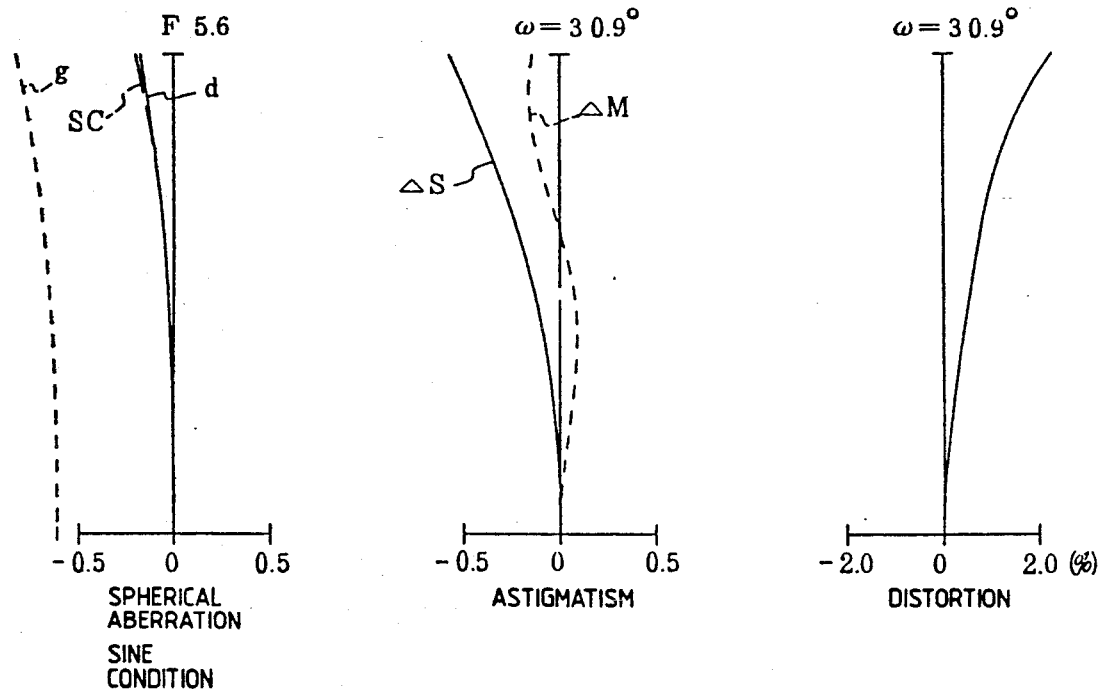
FIGS. 2-A and 2-B show aberrations at a short focal end and a long focal end, respectively, of the first embodiment.
Figure 2B:
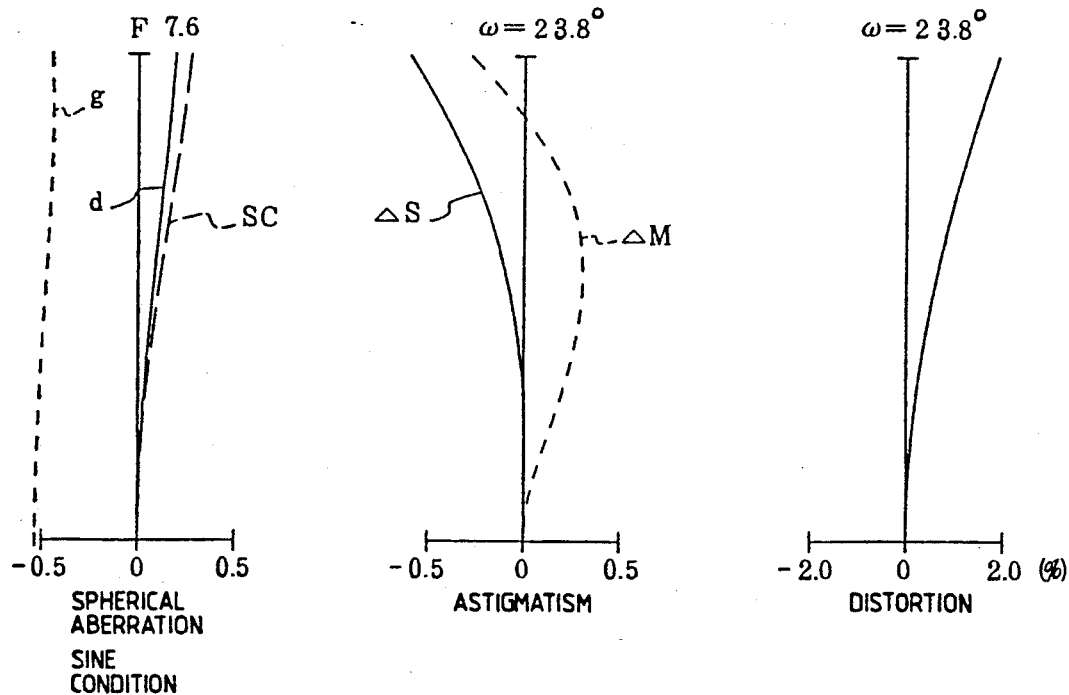

As shown in section in FIG. 1, a first embodiment has realized a variable focal length lens having a minimum structure wherein a first lens unit merely comprises two positive meniscus lenses arranged so that concave surfaces thereof are opposed to each other with a diaphragm put therebetween. The concave surfaces constitute the surfaces of smaller curvature of the two positive meniscus lenses. A negative second lens unit is composed of a negative lens. In the present embodiment, in order that a chromatic aberration is well corrected, it is preferable that glasses of two lenses of the first lens unit are selected so as to satisfy the following condition:

$$(V_1+V_2)/2 > 50 \tag{5}$$

wherein $V_1$ and $V_2$ represent the Abbe's number of the first and second lenses, respectively. When the limit of this condition is not satisfied, the chromatic aberration becomes under-corrected.

The second lens unit has a function to flatten an image surface in terms of correction of aberrations. It is preferable that the following condition is satisfied in order to decrease the Petzval's sum:

$$n_3 < 1.7 \tag{6}$$

wherein $n_3$ represents the refractive index of the negative lens of the second lens unit. In order to offset the occurrence of positive distortion of the negative lens, the axial thickness of the positive meniscus lens at the rear of the diaphragm is made thick.

Further, the negative lens of the second lens unit can be subjected to bending to control the coefficient of astigmatism. When the lens is formed into a convex meniscus shape to the image side, the curvature of field is overcompensated, and conversely, when the lens is formed into a convex meniscus shape to the object side, the curvature of field is undercompensated. In the first embodiment, in order to correct the overcompensation of the curvature of field which slightly remains in the front unit, the lens is made to form a double-concave lens in which the image side surface is close to a plane whereby the curvature is well corrected. That is, in the present embodiment, it is preferable that the following condition is satisfied:

$$0.5 < \frac{r_6 + r_5}{r_6 - r_5} < 1 \tag{7}$$

wherein $r_5$ and $r_6$ represent the radius of curvature of the object side and the image side, respectively, of the negative lens of the second lens unit.

Moreover, in the present embodiment, surfaces on both sides with a diaphragm sandwiched therebetween are formed into aspherical surfaces to better correct high order spherical aberrations and coma flare.

In the data table shown below, the surfaces marked with "*" are aspherical surfaces, and the aspherical shape of these aspherical surfaces is represented by the following formula. The X axis lies in a direction of an optical axis, making the advancing direction of light positive in a direction. The Y axis lies perpendicular to the X axis. The aspherical coefficients used are $A_1$, $A_2$, $A_3$, $A_4$, $P_1$, $P_2$, $P_3$ and $P_4$. The coordinates $(x,y)$ of a point on the aspherical surface are determined as follows:

$$x = \frac{y^2/R}{1 + \sqrt{1 - (1+K)y^2/R^2}} + A_1 y^{P_1} + A_2 y^{P_2} + A_3 y^{P_3} + A_4 y^{P_4}.$$

Wherein R is the paraxial radius of curvature.

| f = 36.1–49.0 | F No = 5.6–7.6 | ω = 30.9°–23.8° | |
|---|---|---|---|
| No. | R | D | Nd | vd |
| 1 | 21.6.5 | 2.07 | 1.48749 | 66.0 |
| 2 | 24.813 * | 4.00 | | |
| 3 | −26.033 * | 8.00 | 1.49700 | 81.6 |
| 4 | −10.468 * | variable | | |
| 5 | −24.429 * | 1.00 | 1.58700 | 30.0 |
| 6 | 641.890 | | | |

| f | D$_4$ |
|---|---|
| 36.1 | 22.3 |
| 49.0 | 13.8 |

Aspherical coefficient
Second surface
$K = 4.26392$
$A_1 = 5.08966 \times 10^{-6}$  $P_1 = 4.0$
$A_2 = 2.57852 \times 10^{-8}$  $P_2 = 6.0$
$A_3 = 3.76242 \times 10^{-12}$  $P_3 = 8.0$
$A_4 = 4.75883 \times 10^{-16}$  $P_4 = 10.0$
Third surface
$K = 1.65585 \times 10$
$A_1 = -7.22522 \times 10^{-5}$  $P_1 = 4.0$
$A_2 = 3.01457 \times 10^{-8}$  $P_2 = 6.0$
$A_3 = 3.20262 \times 10^{-12}$  $P_3 = 8.0$
$A_4 = 1.03666 \times 10^{-16}$  $P_4 = 10.0$
Fourth surface
$K = 2.37790 \times 10^{-1}$
$A_1 = 1.71857 \times 10^{-5}$  $P_1 = 4.0$
$A_2 = -1.15170 \times 10^{-8}$  $P_2 = 6.0$
$A_3 = -6.13432 \times 10^{-12}$  $P_3 = 8.0$
$A_4 = -2.09790 \times 10^{-14}$  $P_4 = 10.0$
Fifth surface
$K = -6.99510 \times 10^{-2}$
$A_1 = -1.09603 \times 10^{-5}$  $P_1 = 4.0$
$A_2 = 7.12342 \times 10^{-8}$  $P_2 = 6.0$
$A_3 = -2.25388 \times 10^{-10}$  $P_3 = 8.0$
$A_4 = 3.15293 \times 10^{-14}$  $P_4 = 10.0$

Second Embodiment

Figure 3:
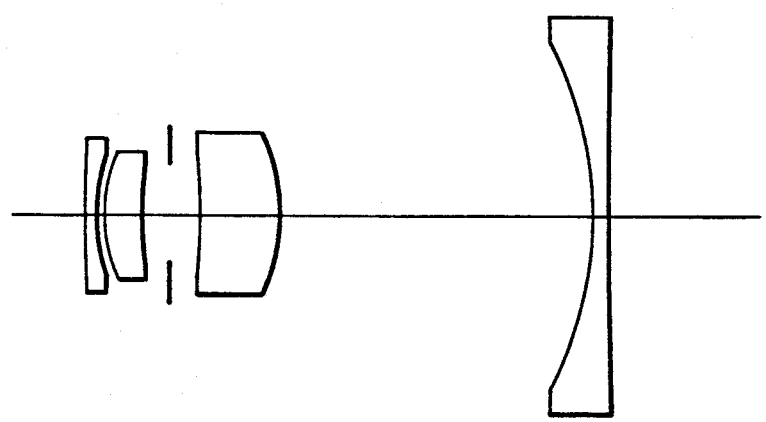
FIG. 3 and FIGS. 4-A and 4-B are a sectional view and aberrations, respectively, of the second embodiment.
Figure 5:
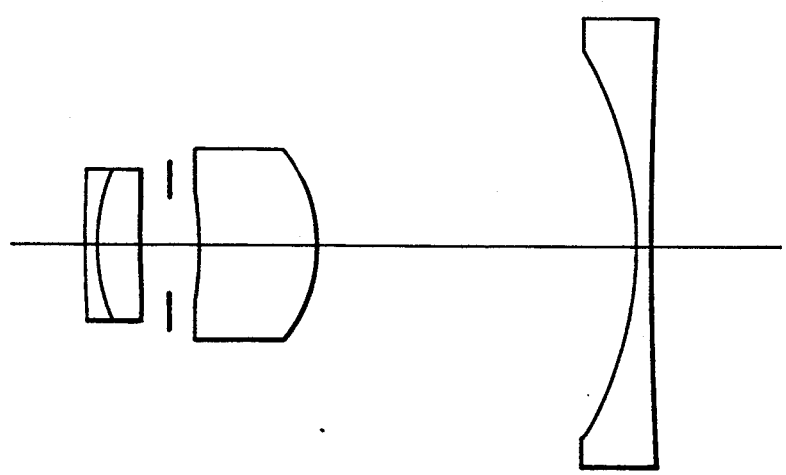
FIG. 5 and FIGS. 6-A and 6-B are a sectional view and aberrations, respectively, of the third embodiment.
Figure 4A:
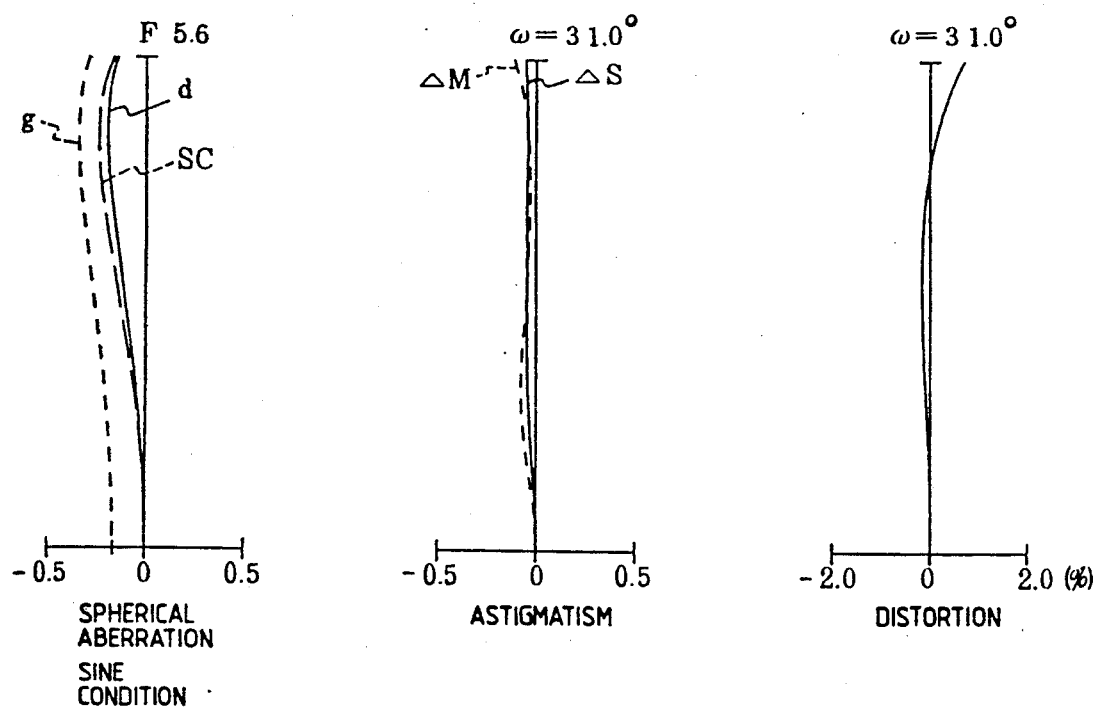
Figure 4B:
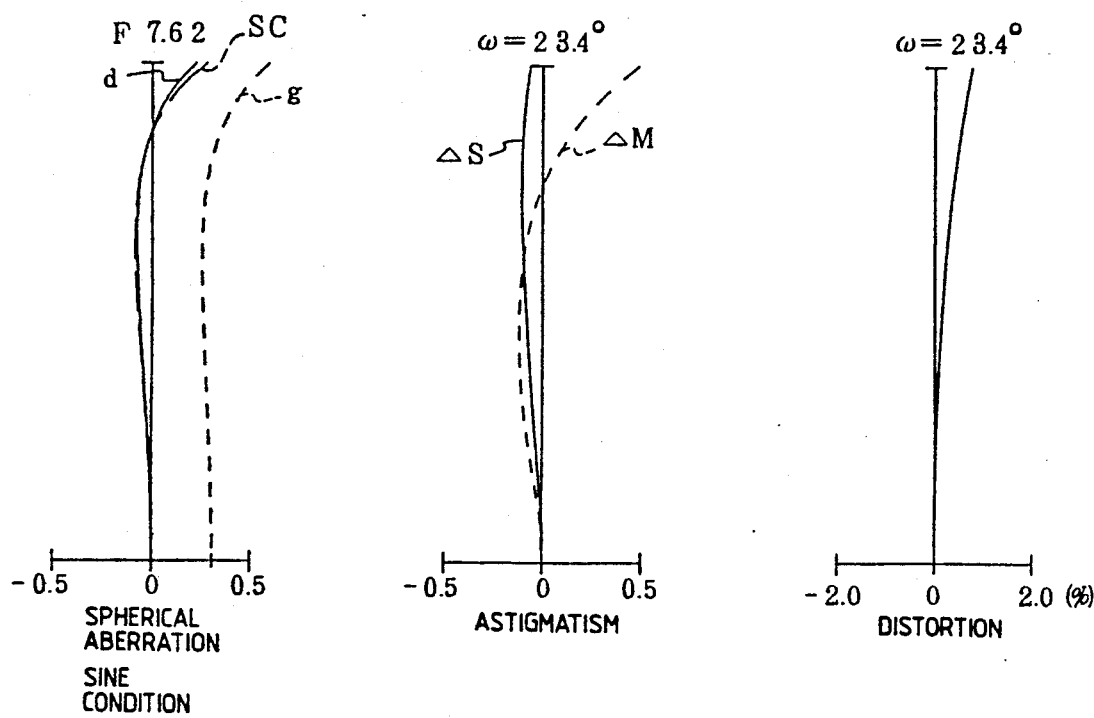
Figure 6A:
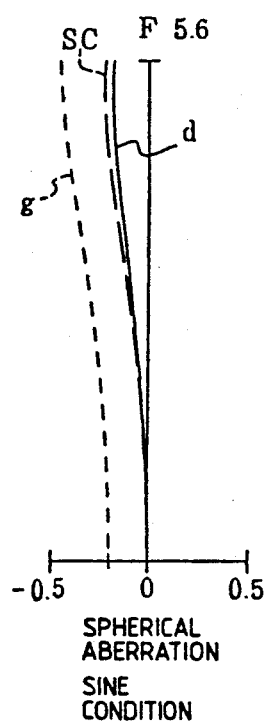
Figure 6A:
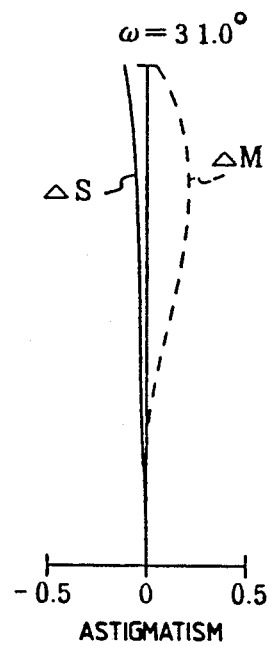
Figure 6A:
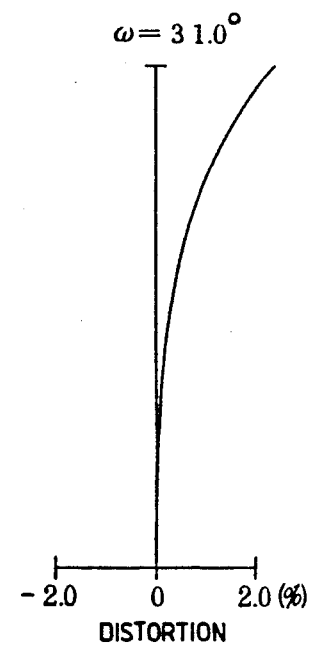
Figure 6B:
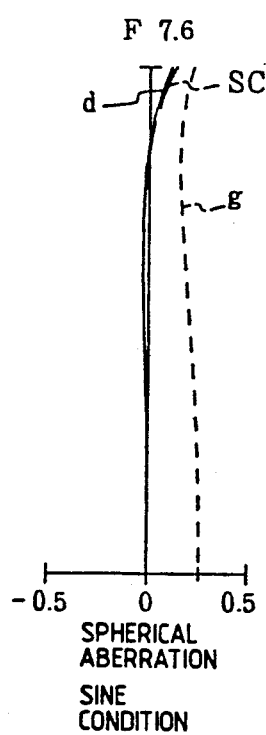
Figure 6B:
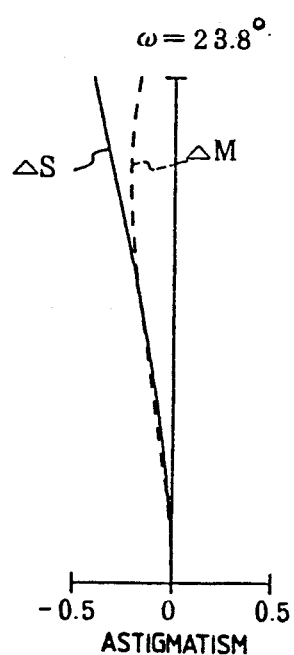
Figure 6B:
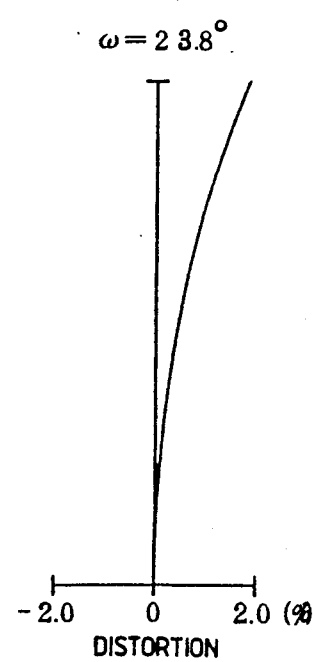

In the second embodiment, as shown in section in FIG. 3, in order to further improve the chromatic aberration, a negative meniscus lens with a convex surface directed toward an object is arranged on the object side of the front unit, and two positive meniscus lenses having concave surfaces opposed to each other with a diaphragm sandwiched therebetween are provided. Thereby, the symmetry of portions before and behind the diaphragm of the entire system is improved, and the distortion becomes very small.

Furthermore, the negative lens is disposed to thereby further decrease the Petzval's sum, the curvature of field is well corrected, the incident angle of the off-axial ray bundle into the second lens is small, and the occurrence of chromatic aberration is very small.

In the present embodiment, plastic lenses are used. A plastic lens has large variations of refractive index resulting from variations of temperature, and therefore, a variation of back focal length, namely, a variation of image point becomes a problem. Although this can be corrected mechanically, it is preferable that this is corrected in the lens itself. Generally, in a two unit variable focal length lens as in the present invention, the back focal length is varied in accordance with the following formula by variation of the focal length and the position of principal points of each of the units:

$$\Delta f_B = (f/f_1)^2 \Delta f_1 + (f_B/f_2)^2 \Delta f_2 - (f/f_1)^2 \Delta D - \Delta P_2 \qquad (b)$$

wherein $\Delta f_B$ represents the variation of back focal length; $\Delta f_1$ and $\Delta f_2$, the variation of the focal lengths of the first and second lens units, respectively; $\Delta D$, the variation of the space between the principal point on the rear side of the first lens unit and the principal point on the front side of the second lens unit; and $\Delta P_2$, the variation of the position of the principal point on the rear side of the second lens unit. $f$ and $f_B$ represent the focal length and the back focal length of the entire system, respectively.

In a variable focal length lens as in the present invention, the back focal length $f_B$ is excessively short as compared with the focal length $f$, and $(f/f_1)^2$ in the formula (b) is very large as compared with $(f_B/f_2)^2$. $\Delta D$ and $\Delta P_2$ caused by the variation of the position of the principal points are small. Accordingly, it becomes difficult to correct the variation of the focal length caused by the variation of temperature of the first lens unit by the variation of the focal length of the second lens unit. That is, it is necessary to correct the influence of the variation of temperature in each unit. In the present embodiment, the negative meniscus first lens and the positive meniscus second lens are formed from plastics, and the resultant focal length of the first and second lenses is made sufficiently lengthy to correct the variation of temperature of the first lens unit.

In this manner, in the present embodiment, the variation of the back focal length when a variation by 30° was made after standard use could be made into very small values, that is, −0.06 at the short focal end and −0.1 at the long focal end. The provision of three plastic lenses among four lenses aids in reducing the weight of a camera.

The second unit is composed of the double-concave lens whereby not only the spherical aberration but the curvature of field in over correction which slightly remains in the first unit are corrected. Furthermore, by introducing aspherical surfaces into the first and second plastic lenses, the coma flare is well corrected.

| f = 36.0–49.0 | F No = 5.6–7.62 | ω = 31.0°–23.4° | | |
|---|---|---|---|---|
| No. | R | D | Nd | νd |
| 1 | 86.825 | 0.80 | 1.58700 | 30.0 |
| 2 | 13.855 * | 0.50 | | |
| 3 | 10.423 * | 2.50 | 1.49200 | 57.0 |
| 4 | 23.505 * | 4.00 | | |
| 5 | −56.928 | 5.50 | 1.71300 | 53.9 |
| 6 | −13.458 | variable | | |
| 7 | −24.339 | 1.00 | 1.67270 | 32.1 |
| 8 | 323.360 | | | |

| f | $D_6$ |
|---|---|
| 36.0 | 21.5 |
| 49.0 | 14.8 |

Aspherical coefficient
Second surface
K = 3.69373
$A_1$ = 1.56640 × 10⁻⁵    $P_1$ = 4.0
$A_2$ = −5.81988 × 10⁻⁹   $P_2$ = 6.0
$A_3$ = 5.35799 × 10⁻¹⁴   $P_3$ = 8.0
$A_4$ = 1.16529 × 10⁻¹⁸   $P_4$ = 10.0
Third surface
K = 2.01413
$A_1$ = −1.90739 × 10⁻⁵   $P_1$ = 4.0

-continued

| f = 36.0–49.0 | F No = 5.6–7.62 | ω = 31.0°–23.4° |
|---|---|---|

$A_2$ = 3.03073 × 10⁻⁹    $P_2$ = 6.0
$A_3$ = −2.45431 × 10⁻¹⁴  $P_3$ = 8.0
$A_4$ = −4.57696 × 10⁻¹⁹  $P_4$ = 10.0
Fourth surface
K = 1.98782 × 10
$A_1$ = 2.33857 × 10⁻⁵    $P_1$ = 4.0
$A_2$ = −4.16131 × 10⁻¹⁰  $P_2$ = 6.0
$A_3$ = −1.80062 × 10⁻¹⁵  $P_3$ = 8.0
$A_4$ = 1.09292 × 10⁻²⁰   $P_4$ = 10.0

Third Embodiment

In the third embodiment, the first lens of the first embodiment is composed of a cemented lens of a negative meniscus lens and a positive meniscus lens. By this cemented lens, the chromatic aberration is well corrected similar to the second embodiment, and eccentricity between the first lens and the second lens when assembled is eliminated, making the lens to be easy to manufacture.

| f = 36.0–49.0 | F No = 5.6–7.6 | ω = 31.0°–23.8° | | |
|---|---|---|---|---|
| No. | R | D | Nd | νd |
| 1 | 56.224 | 0.80 | 1.59270 | 35.3 |
| 2 | 11.092 | 3.00 | 1.69680 | 55.5 |
| 3 | 45.274 | 4.00 | | |
| 4 | 20.267 * | 8.00 | 1.49200 | 57.0 |
| 5 | −9.702 * | variable | | |
| 6 | −24.308 | 1.00 | 1.58700 | 30.0 |
| 7 | 268.253 | | | |

| f | $D_5$ |
|---|---|
| 36.0 | 22.1 |
| 49.0 | 14.1 |

Aspherical coefficient
Fourth surface
K = 1.20973 × 10
$A_1$ = −1.12389 × 10⁻⁴   $P_1$ = 4.0
$A_2$ = 7.42209 × 10⁻⁸    $P_1$ = 6.0
$A_3$ = 1.25441 × 10⁻¹²   $P_3$ = 8.0
$A_4$ = −1.41457 × 10⁻¹⁷  $P_4$ = 10.0
Fifth surface
K = 2.27567 × 10⁻¹
$A_1$ = 1.85240 × 10⁻⁵    $P_1$ = 4.0
$A_2$ = 1.99205 × 10⁻⁷    $P_2$ = 6.0
$A_3$ = 2.88111 × 10⁻¹⁰   $P_3$ = 8.0

Fourth Embodiment

Figure 7:
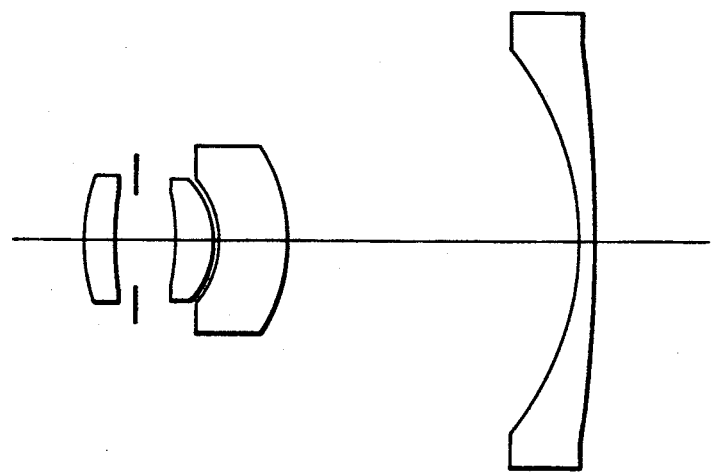
FIG. 7 and FIGS. 8-A and 8-B are a sectional view and aberrations, respectively, of the fourth embodiment.

In the fourth embodiment, as shown in section in FIG. 7, a negative meniscus lens with a concave surface directed toward an object is disposed directly after a positive meniscus lens at the rear of a diaphragm to suppress the occurrence of a chromatic aberration in the first lens unit, and other aberrations are also well corrected. In the present embodiment, it is preferable that glass material be disposed so as to satisfy the following conditions:

$$(\nu_1 + \nu_2)/2 > 50 \qquad (8)$$

$$\nu_3 < 40 \qquad (9)$$

$$\nu_4 > 50 \qquad (10)$$

wherein $\nu_1$, $\nu_2$, $\nu_3$ and $\nu_4$ represent the Abbe's number of the first, second, third and fourth lenses, respectively. When the limit of condition (8) is not satisfied, and the limit of condition (9) is exceeded, the axial chromatic aberration becomes under corrected. When the limit of condition (10) is not satisfied, a variation of chromatic aberration caused by variation of power increases.

| f = 36.0–49.0 | F No = 5.6–7.62 | ω = 31.0°–23.8° | | |
|---|---|---|---|---|
| No. | R | D | Nd | νd |
| 1 | 12.451 | 2.00 | 1.69680 | 55.3 |
| 2 | 17.182 | 4.15 | | |
| 3 | −14.590 * | 2.66 | 1.49200 | 57.0 |
| 4 | −5.457 * | 0.20 | | |
| 5 | −6.442 | 4.80 | 1.58700 | 30.0 |
| 6 | −12.094 * | variable | | |
| 7 | −17.698 * | 1.00 | 1.49200 | 57.0 |
| 8 | −82.605 * | | | |

| f | $D_6$ |
|---|---|
| 36.1 | 20.0 |
| 49.0 | 9.74 |

Aspherical coefficient
third surface
K = 6.95955 × 10$^{-1}$
$A_1$ = −1.92999 × 10$^{-4}$   $P_1$ = 4.0
$A_2$ = 2.42767 × 10$^{-7}$   $P_2$ = 6.0
Fourth surface
K = −4.24130 × 10$^{-1}$
$A_1$ = 1.91680 × 10$^{-4}$   $P_1$ = 4.0
$A_2$ = −1.41469 × 10$^{-7}$   $P_2$ = 6.0
$A_3$ = 4.70122 × 10$^{-11}$   $P_3$ = 8.0
Sixth surface
K = −4.18723 × 10$^{-1}$
$A_1$ = −1.95957 × 10$^{-4}$   $P_1$ = 4.0
$A_2$ = −2.47628 × 10$^{-8}$   $P_2$ = 6.0
Seventh surface
K = −9.44908 × 10$^{-1}$
$A_1$ = −4.97890 × 10$^{-5}$   $P_1$ = 4.0
$A_2$ = 3.19130 × 10$^{-7}$   $P_2$ = 6.0
Eighth surface
K = 1.09452 × 10$^{-1}$
$A_1$ = 2.99062 × 10$^{-6}$   $P_1$ = 4.0
$A_2$ = 5.76995 × 10$^{-8}$   $P_2$ = 6.0

Fifth Embodiment

Figure 9:
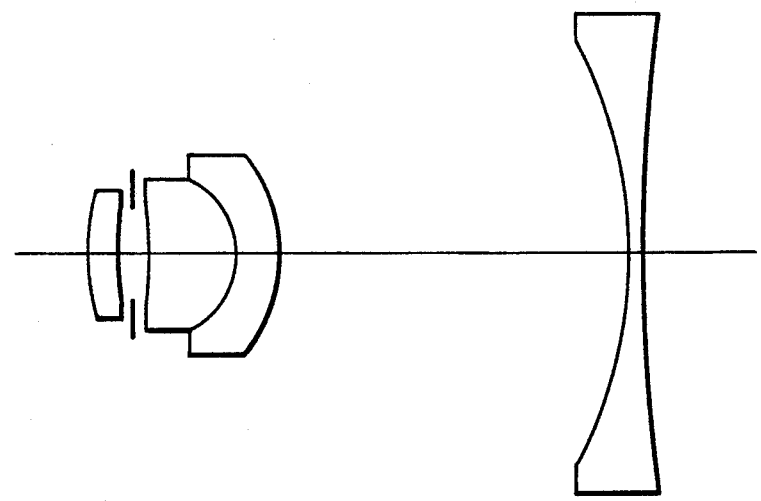
FIG. 9 and FIGS. 10-A and 10-B are a sectional view and aberrations, respectively, of the fifth embodiment.
Figure 8A:
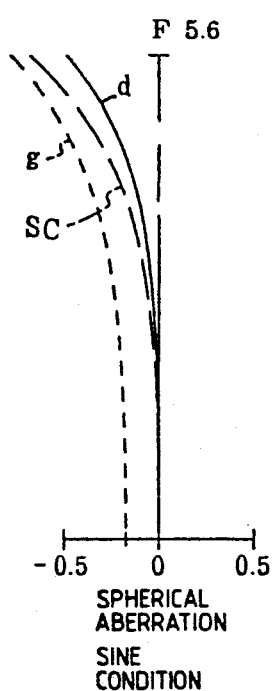
Figure 8A:
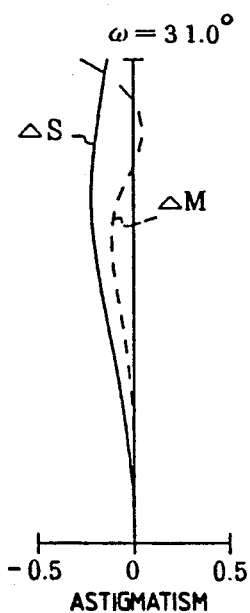
Figure 8A:
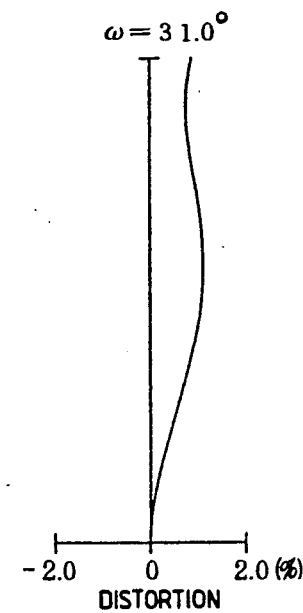
Figure 8B:
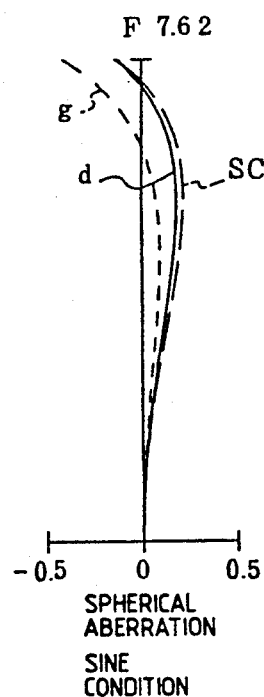
Figure 8B:
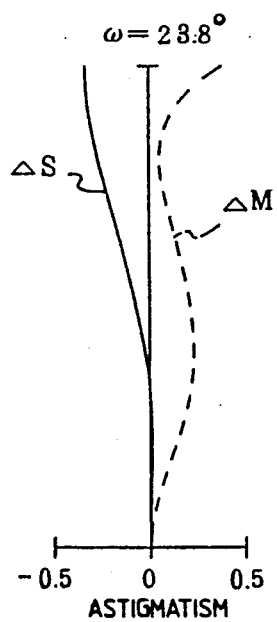
Figure 8B:
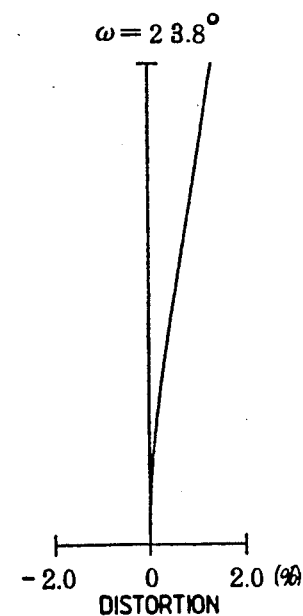
Figure 10A:
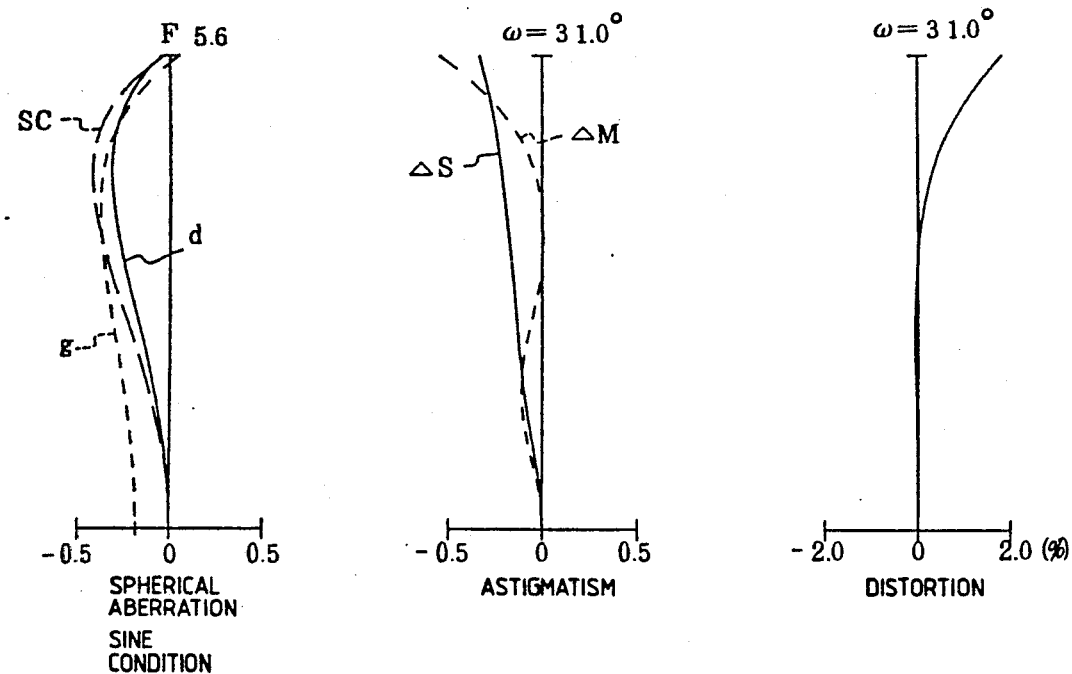
Figure 10B:
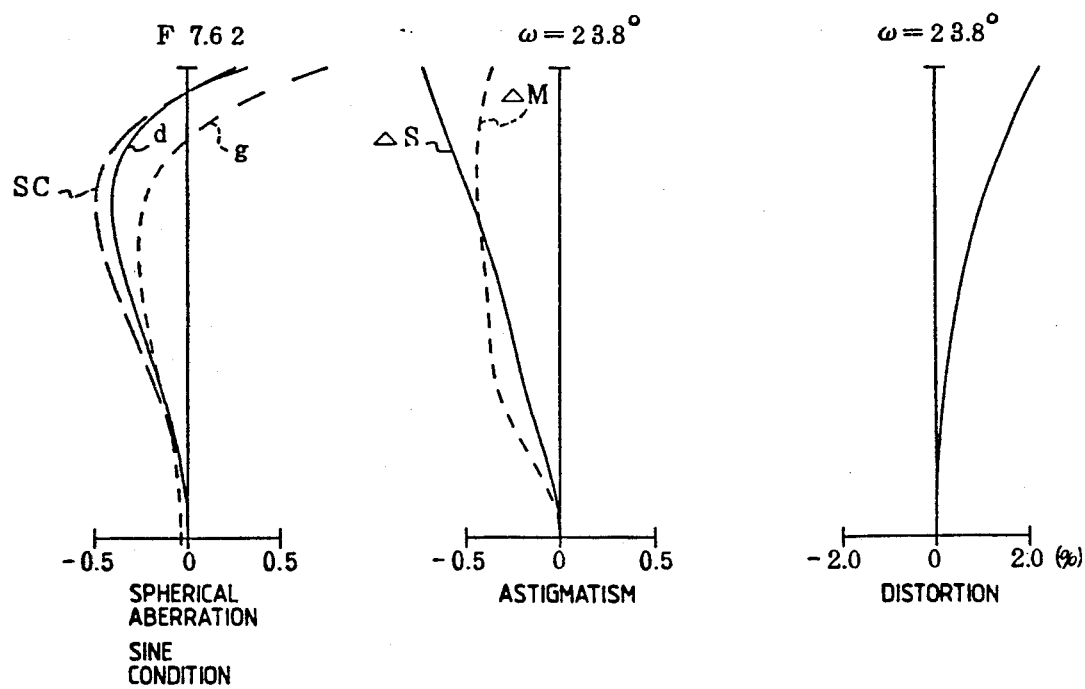

In the fifth embodiment, as shown in section of FIG. 9, a positive lens at the rear in a diaphragm comprises a positive meniscus lens and a negative meniscus lens, both of which are cemented to each other to correct chromatic aberration. Particularly, the chromatic aberration of magnification can be corrected very well by this cementing, and less variation of chromatic aberration due to variation of power occurs. In terms of construction, the rear negative meniscus lens can be made large in its diameter due to this cementing as shown. The rear negative meniscus lens portion may well be held when the lenses are incorporated, and a sufficient space may be created for a diaphragm and a shutter mechanism.

| f = 36.0–49.0 | F No = 5.6–7.62 | ω = 31.0°–23.8° | | |
|---|---|---|---|---|
| No. | R | D | Nd | νd |
| 1 | 15.707 | 2.00 | 1.77250 | 49.6 |
| 2 | 20.597 | 2.16 | | |
| 3 | −21.814 | 5.99 | 1.60342 | 38.0 |
| 4 | −5.320 | 2.86 | 1.80518 | 25.4 |
| 5 | −10.249 | variable | | |
| 6 | −28.974 | 1.00 | 1.56883 | 56.3 |
| 7 | 125.970 | | | |

| f | D |
|---|---|
| 36.0 | 24.0 |
| 49.0 | 14.88 |

Sixth Embodiment

Figure 11:
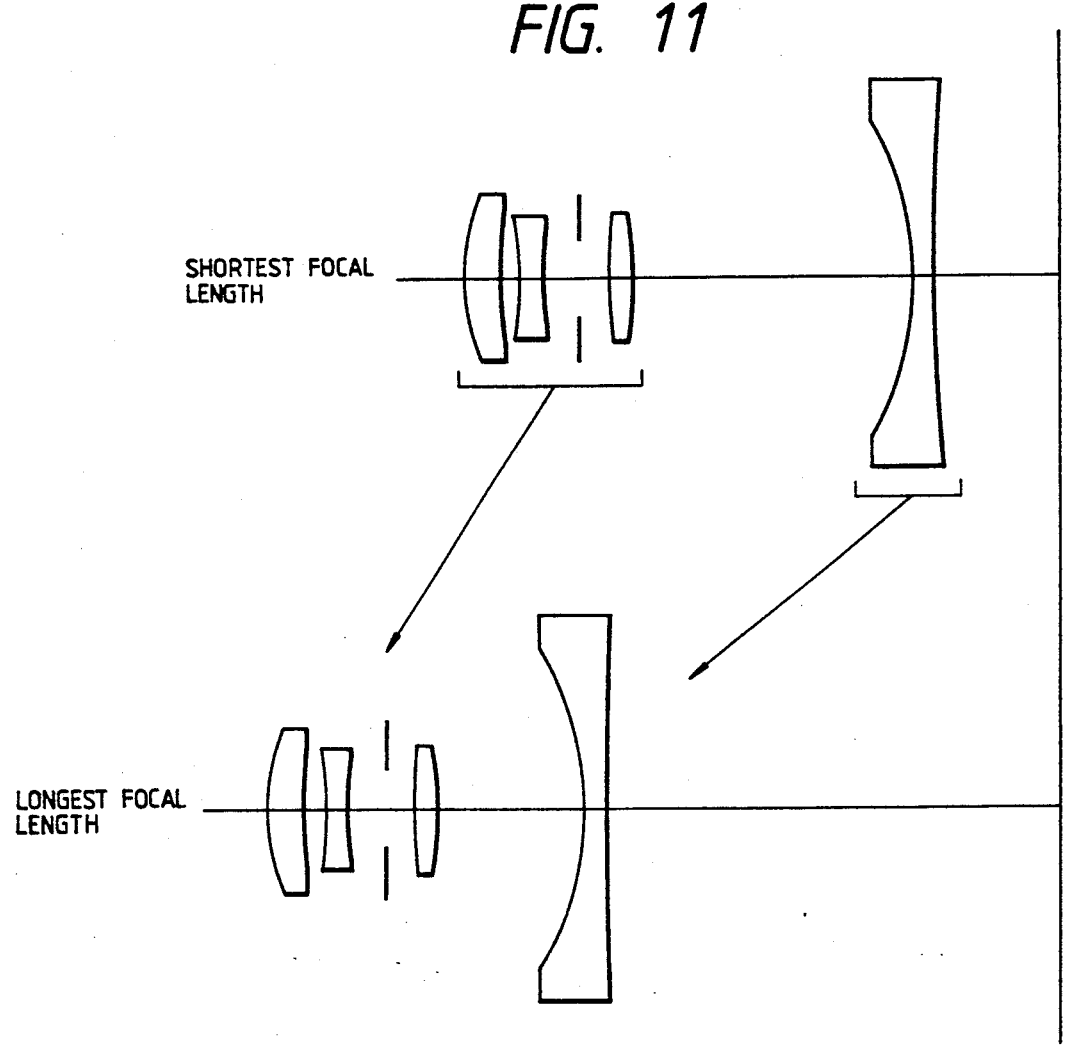
FIG. 11 and FIGS. 12-A and 12-B are a sectional view and aberrations, respectively, of the sixth embodiment.

In the sixth embodiment, as shown in section in FIG. 11, a first lens unit is composed of three lenses, positive, negative and positive. The second lens and the third lens are formed of plastic, and aspherical surfaces are introduced into a surface on the object side of the second lens and a surface on the pupil side of the third lens. This results in reduction in cost and improvements in the off-axial aberrations such as distortion, astigmatism, etc.

In this embodiment, the shape of the aspherical surface in the second lens is selected so that the off-axial negative refracting power becomes stronger and the shape of the aspherical surface in the third lens is selected so that the off-axial positive refracting power becomes weaker.

| f = 40.0–60.0 | F No. 5.6–8 | ω = 28.4°–19.8° | | |
|---|---|---|---|---|
| No. | R | D | Nd | νd |
| 1 | 17.319 | 2.50 | 1.77250 | 49.6 |
| 2 | 38.664 | 1.60 | | |
| 3 | −39.986 * | 1.50 | 1.58700 | 30.0 |
| 4 | 25.689 | 5.00 | | |
| 5 | 49.128 | 2.00 | 1.49200 | 57.0 |
| 6 | −15.168 * | variable | | |
| 7 | −21.072 | 1.50 | 1.51633 | 64.1 |
| 8 | 400.000 | | | |

| f | $D_6$ |
|---|---|
| 40 | 21.00 |
| 60 | 10.79 |

Aspherical coefficient
Third surface
K = 2.17500
$A_1$ = −3.10990 × 10$^{-5}$   $P_1$ = 4.0
$A_2$ = −4.59059 × 10$^{-7}$   $P_2$ = 6.0
Sixth surface
K = −8.43173
$A_1$ = −2.63761 × 10$^{-4}$   $P_1$ = 4.0
$A_2$ = 2.20200 × 10$^{-5}$   $P_1$ = 6.0

Seventh Embodiment

Figure 13:
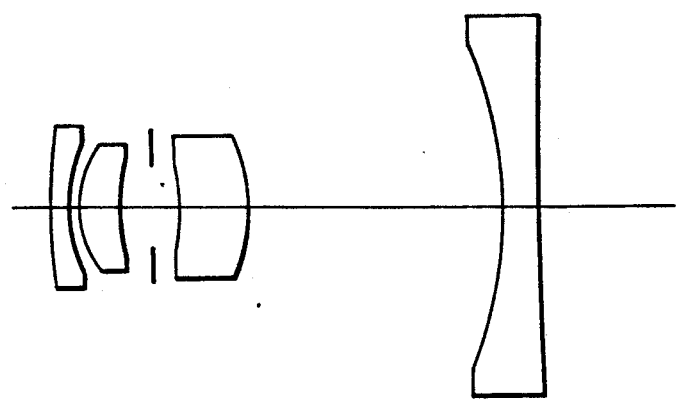
FIG. 13 and FIGS. 14-A and 14-B are a sectional view and aberrations, respectively, of the seventh embodiment.
Figure 12A:
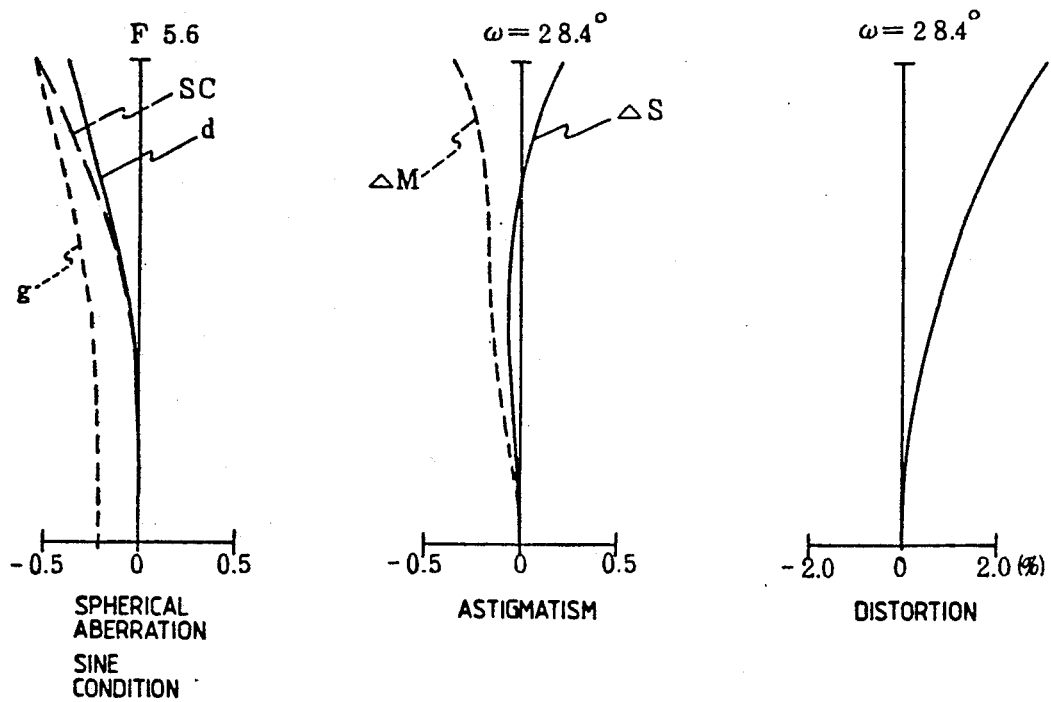
Figure 12B:
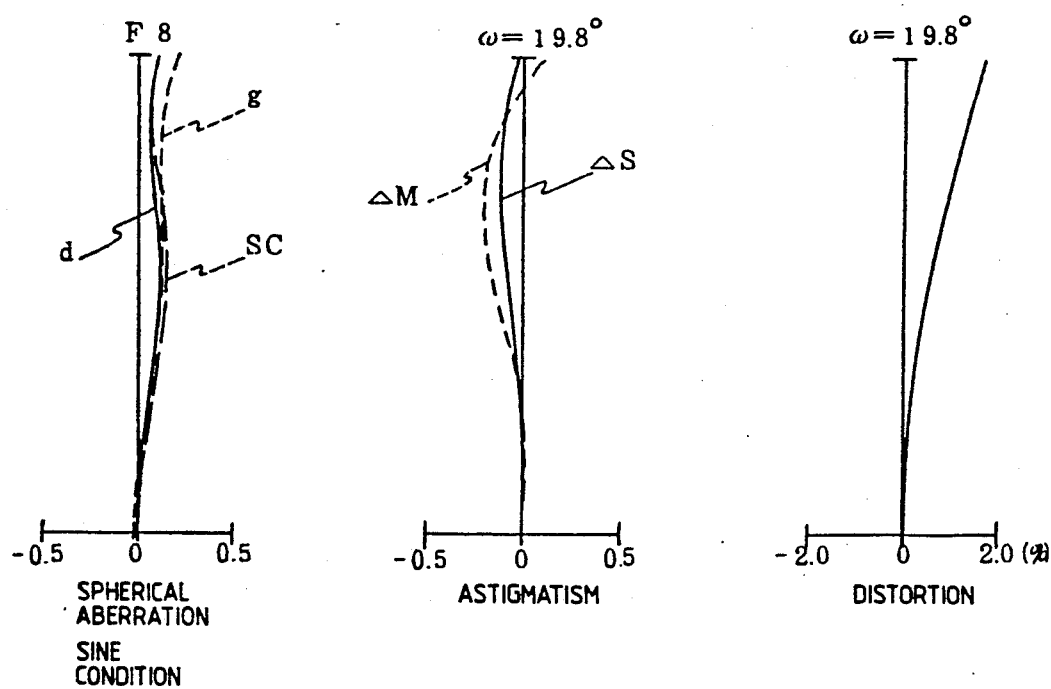
Figure 14A:
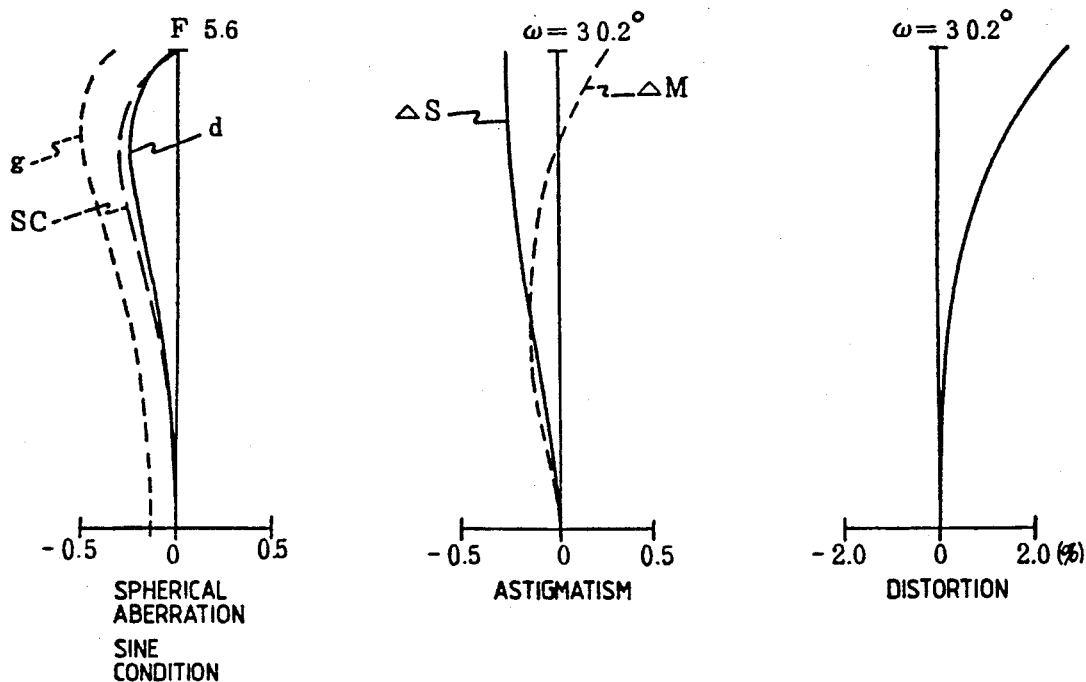
Figure 14B:
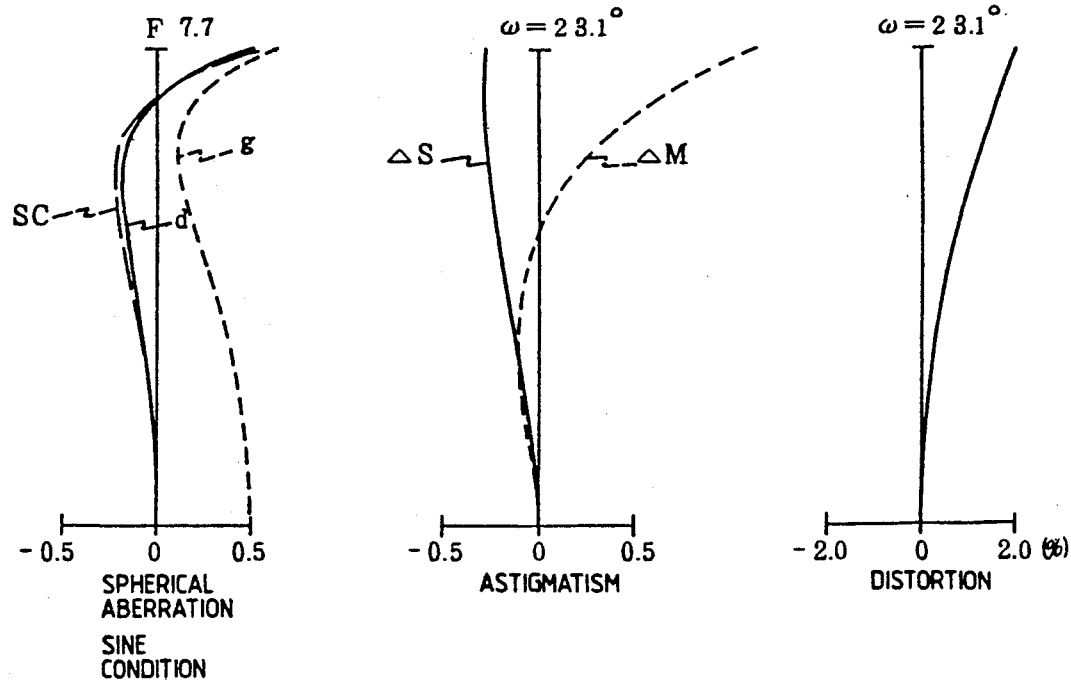
Figure 15:
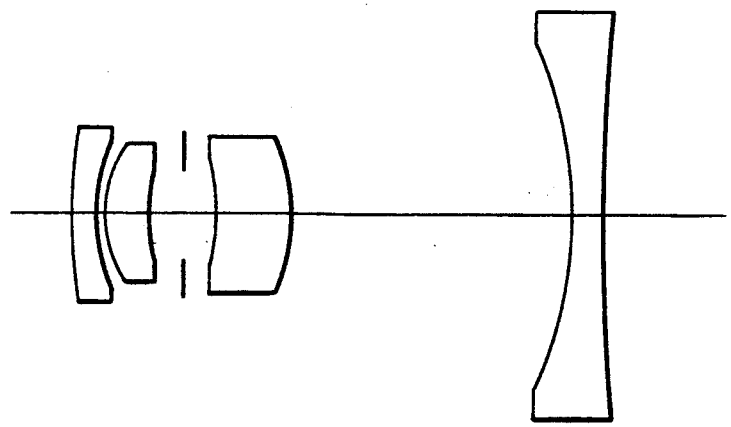
FIG. 15 and FIGS. 16-A and 16-B are a sectional view and aberrations, respectively, of the eighth embodiment.
Figure 16A:
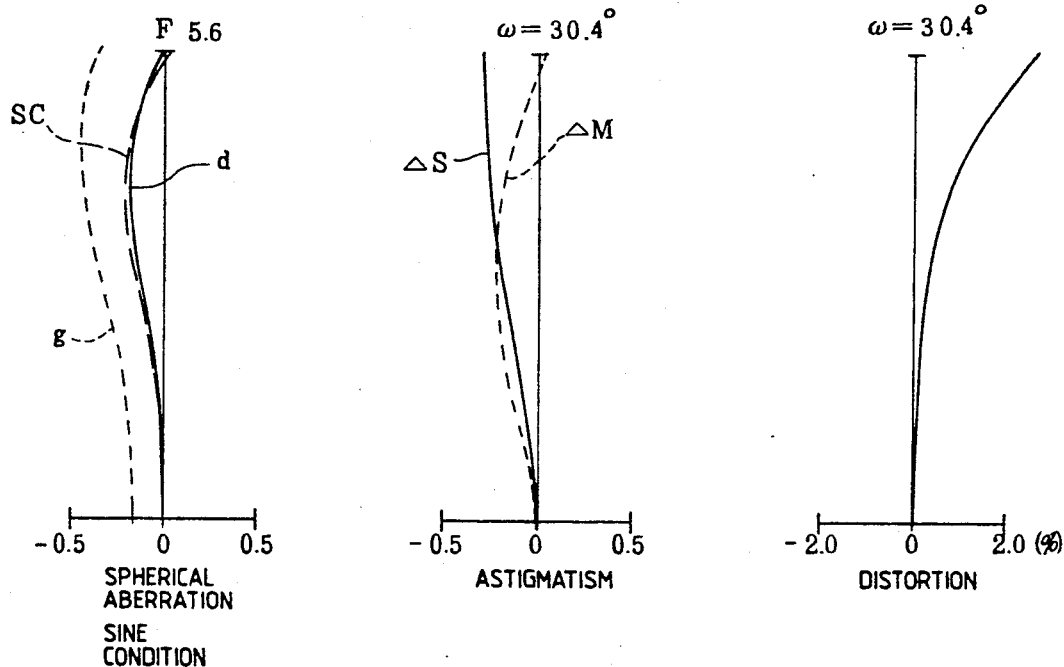
Figure 16B:
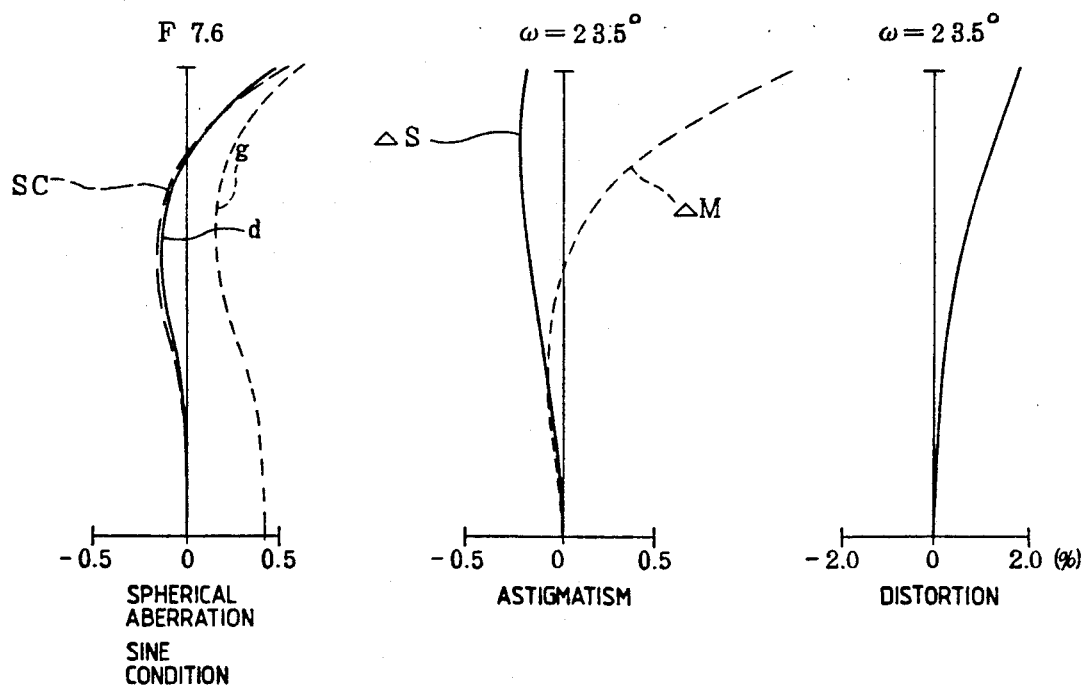

In this embodiment, as shown in FIG. 13, a first lens comprises a negative meniscus lens having a convex surface directed toward an object, said meniscus lens being disposed on the object side, and two positive meniscus lenses having concave surfaces opposed to each other with a diaphragm sandwiched therebetween, similar to the second embodiment.

| f = 36.09–49.69 | F No. 5.6–7.7 | ω = 30.2°–23.1° | | |
|---|---|---|---|---|
| No. | R | D | Nd | νd |
| 1 | 33.700 | 1.50 | 1.58300 | 30.0 |
| 2 | 10.969 * | 0.60 | | |
| 3 | 7.470 | 3.00 | 1.49200 | 57.0 |
| 4 | 16.550 * | 4.50 | | |
| 5 | −24.889 | 5.00 | 1.77250 | 49.6 |
| 6 | −12.581 | variable | | |
| 7 | −29.124 | 2.60 | 1.69895 | 30.1 |
| 8 | 392.085 | | | |

| f | $D_6$ |
|---|---|
| 36.09 | 19.1 |
| 49.69 | 10.9 |

Aspherical coefficient
Second surface
K = −1.36420
A1 = 1.69060 × 10$^{-5}$   P1 = 4.0
A2 = −1.42060 × 10$^{-6}$   P2 = 6.0

-continued

| f = 36.09–49.69 | F No. 5.6–7.7 | ω = 30.2°–23.1° |
|---|---|---|
| Fourth surface | | |
| K = | 1.05260 × 10 | |
| A1 = | 2.66200 × 10$^{-4}$ | P1 = 4.0 |

Eighth Embodiment

The lens of this embodiment is composed of, in order from the object side, a negative meniscus lens having a convex surface directed toward an object, a positive menicus lens having a convex surface directed toward an object, a diaphragm, a thick positive meniscus lens having a concave surface directed toward an object and a double-concave lens, similar to the second and sixth embodiments. The first and second lenses each have aspherical surfaces on the image side to correct off-axial aberrations in a satisfactory manner. In the case where aspherical surfaces are used at the same time for two surfaces which are opposed to each other as in the opposed surfaces of the first and second lenses in this embodiment and having the radius of curvature of the size close to each other, they are liable to be affected by eccentricity. However, in this embodiment and the sixth embodiment, the aspherical surfaces are preferably not arranged close to each other to eliminate the influence of eccentricity to effectively correct aberrations.

Furthermore, in this embodiment, the first, second and fourth lenses are formed from plastic lenses to form a zoom lens which is low in cost and light-weight and which is less affected by a variation of environment such as temperature. The zoom lens is suitable for a compact camera or the like.

| f = 35.99–48.89 | F No. 5.6–7.6 | ω = 30.4°–23.5° | | |
|---|---|---|---|---|
| No. | R | D | Nd | νd |
| s | 33.700 | 1.50 | 1.58600 | 30.0 |
| 2 | 10.969 * | 0.60 | | |
| 3 | 7.470 | 3.00 | 1.49200 | 58.3 |
| 4 | 16.550 * | 4.50 | | |
| 5 | −25.190 | 5.00 | 1.77250 | 49.6 |
| 6 | −12.645 | variable | | |
| 7 | −27.751 | 2.00 | 1.58600 | 30.0 |
| 8 | 178.070 | | | |

| f | D$_6$ |
|---|---|
| 35.99 | 18.9 |
| 48.89 | 10.5 |

| Aspherical coefficient | | |
|---|---|---|
| Second surface | | |
| K = | −1.36420 | |
| A1 = | 1.69060 × 10$^{-5}$ | P1 = 4.0 |
| A2 = | −1.42060 × 10$^{-6}$ | P2 = 6.0 |
| Sixth surface | | |
| K = | 1.05260 × 10 | |
| A1 = | 2.66200 × 10$^{-4}$ | P1 = 4.0 |

As can be understood from the aforementioned embodiments and aberration diagrams, the variable focal length lens according to this invention has, despite the very simple structure of two units and about four lenses, a sufficient extent of variation of power and brightness for a compact camera. The lens is compact. The lens is capable of variation of power including a wide angle of which half angle of view is approximately 30°, wherein well balanced correction of aberrations is realized over the entire extent of variation of power. In addition, plastic lenses are employed, and a variable focal length lens, which is low in cost, compact and high in practical utility, is realized.

What is claimed is:

1. A variable focal length compound lens comprising:
   a positive first lens unit including two positive lenses, each positive lens having a first surface and a second surface having a smaller curvature than the first surface, the surfaces of smaller curvature of the lenses being positioned facing each other;
   a diaphragm positioned between the positive lenses of the first lens unit and adjacent the second surface of each positive lens; and
   a negative second lens unit including a single negative lens,
   the variable focal length compound lens satisfying the following condition:

$$f_2/f_w < -0.5$$

wherein $f_2$ represents the focal length of the second lens unit, and $f_w$ represents the lower limit of a range of variation of the focal length of the variable focal length compound lens.

2. The variable focal length lens of claim 1 wherein said first lens unit further includes a negative lens having a concave surface, the negative lens being positioned at an object side of said positive lenses and the concave surface being positioned facing toward said positive lenses.

3. The variable focal length lens of claim 2 wherein said negative lens includes a contacting region which contacts one of said positive lenses.

4. The variable focal length lens of claim 1 wherein said first lens unit further includes a negative lens having a concave surface, said negative lens being positioned at an image side of said positive lenses and the concave surface being positioned facing toward said positive lenses.

5. The variable focal length lens of claim 4 wherein said negative lens includes a contacting region which contacts one of said positive lenses.

6. A variable focal length compound lens comprising:
   a positive first lens unit including two positive lenses, each positive lens having a first surface and a second surface having a smaller curvature than the first surface, the surfaces of smaller curvature of the lenses being positioned facing each other;
   a diaphragm positioned between the positive lenses of the first lens unit and adjacent the second surface of each positive lens; and
   a negative second lens unit including a single negative lens,
   the variable focal length compound lens satisfying the following condition:

$$\left| \frac{f_1}{f_w} - \left( \frac{f_2/f_w}{(f_2/f_w) - 1} \right)^{\frac{1}{2}} \right| < 0.2$$

wherein $f_1$ and $f_2$ represent the focal lengths of the first lens unit and the second lens unit, respectively, and $f_w$ represents the lower limit of a range of variation of the focal length of the variable focal length compound lens.

7. The variable focal length lens of claim 6 wherein said first lens unit further includes a negative lens having a concave surface, the negative lens being positioned at an object side of said positive lenses and the concave surface being positioned facing toward said positive lenses.

8. The variable focal length lens of claim 7 wherein said negative lens includes a contacting region which contacts one of said positive lenses.

9. The variable focal length lens of claim 6 wherein said first lens unit further includes a negative lens having a concave surface, said negative lens being positioned at an image side of said positive lenses and the concave surface being positioned facing toward said positive lenses.

10. The variable focal length lens of claim 9 wherein said negative lens includes a contacting region which contacts one of said positive lenses.

11. A variable focal length compound lens comprising:
- a positive first lens unit including two positive lenses, each positive lens having a first surface and a second surface having a smaller curvature than the first surface, the surfaces of smaller curvature of the lenses being positioned facing each other;
- a diaphragm positioned between the positive lenses of the first lens unit and adjacent the second surface of each positive lens; and
- a negative second lens unit including a single negative lens, the variable focal length compound lens satisfying the following condition:

$$0.7 < |f_2/f_1| < 1.6$$

wherein $f_1$ and $f_2$ represent the focal lengths of the first lens unit and the second lens unit, respectively.

12. The variable focal length lens of claim 11 wherein said first lens unit further includes a negative lens having a concave surface, the negative lens being positioned at an object side of said positive lenses and the concave surface being positioned facing toward said positive lenses.

13. The variable focal length lens of claim 12 wherein said negative lens includes a contacting region which contacts one of said positive lenses.

14. The variable focal length lens of claim 11 wherein said first lens unit further includes a negative lens having a concave surface, said negative lens being positioned at an image side of said positive lenses and the concave surface being positioned facing toward said positive lenses.

15. The variable focal length lens of claim 14 wherein said negative lens includes a contacting region which contacts one of said positive lenses.

16. A variable focal length compound lens comprising:
- a positive first lens unit including two positive lenses, each positive lens having a first surface and a second surface having a smaller curvature than the first surface, the surfaces of smaller curvature of the lenses being positioned facing each other;
- a diaphragm positioned between the positive lenses of the first lens unit and adjacent the second surface of each positive lens; and
- a negative second lens unit including a single negative lens, the variable focal length compound lens satisfying the following condition:

$$D_F/f_w > 0.04 f_w/f_B^w$$

wherein $f_w$ and $f_B^w$ represent the focal length and back focal length, respectively, of the variable focal length compound lens at the lower limit of a range of variation of the focal length, and $D_F$ denotes the sum of the axial thickness of the lenses at a side of the diaphragm in the first lens unit which is opposite to an object side.

17. The variable focal length lens of claim 16 wherein said first lens unit further includes a negative lens having a concave surface, the negative lens being positioned at an object side of said positive lenses and the concave surface being positioned facing toward said positive lenses.

18. The variable focal length lens of claim 17 wherein said negative lens includes a contacting region which contacts one of said positive lenses.

19. The variable focal length lens of claim 16 wherein said first lens unit further includes a negative lens having a concave surface, said negative lens being positioned at an image side of said positive lenses and the concave surface being positioned facing toward said positive lenses.

20. The variable focal length lens of claim 19 wherein said negative lens includes a contacting region which contacts one of said positive lenses.

* * * * *